US008913893B2

(12) United States Patent
Kim et al.

(10) Patent No.: US 8,913,893 B2
(45) Date of Patent: Dec. 16, 2014

(54) VISIBLE LIGHT COMMUNICATION APPARATUS CAPABLE OF MINUTE DIMMING CONTROL AND METHOD USING THE SAME

(75) Inventors: Dae-Ho Kim, Daejeon (KR); Tae-Gyu Kang, Daejeon (KP); Sang-Kyu Lim, Daejeon (KR); Il-Soon Jang, Daejeon (KR); You-Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 13/427,714

(22) Filed: Mar. 22, 2012

(65) Prior Publication Data
US 2013/0004182 A1 Jan. 3, 2013

(30) Foreign Application Priority Data

Jul. 1, 2011 (KR) .......................... 10-2011-0065559
Sep. 15, 2011 (KR) .......................... 10-2011-0093038

(51) Int. Cl.
*H04B 10/00* (2013.01)
*H04B 10/116* (2013.01)

(52) U.S. Cl.
CPC .................................... *H04B 10/116* (2013.01)
USPC ............................ 398/118; 398/189; 398/190

(58) Field of Classification Search
CPC .. H04B 10/116; H04B 10/508; H04B 10/524; H04B 10/564
USPC .................................. 398/118, 189–190, 197
See application file for complete search history.

(56) References Cited

U.S. PATENT DOCUMENTS

| 2007/0092264 A1* | 4/2007 | Suzuki et al. ................. 398/189 |
| 2009/0169215 A1* | 7/2009 | Sauerlander et al. ......... 398/118 |
| 2011/0064416 A1* | 3/2011 | Rajagopal et al. ............ 398/130 |
| 2011/0069962 A1* | 3/2011 | Castor et al. .................. 398/115 |

FOREIGN PATENT DOCUMENTS

JP 2007-097071 A 4/2007

OTHER PUBLICATIONS

Sang-Kyu Lim et al., "IEEE P802.15 Working Group for Wireless Personal Area Networks (WPANs)," IEEE 802.15-11-0264-00-0007, Mar. 2011.
Sang-Kyu Lim et al., "IEEE P802.15 Working Group for Wireless Personal Area Networks (WPANs)," IEEE 802.15-11-0264-01-0007, Mar. 2011.
Sang-Kyu Lim et al., "Wireless Personal Area Networks," IEEE P802.15-11-0302-00-0007, Mar. 2011.
Sang-Kyu Lim et al., "Wireless Personal Area Networks," IEEE P802.15-11-0302-01-0007, Mar. 2011.

* cited by examiner

*Primary Examiner* — Dzung Tran
(74) *Attorney, Agent, or Firm* — William Park & Associates Patent Ltd.

(57) ABSTRACT

Disclosed herein are a visible light communication method and apparatus. The visible light communication method includes determining a dimming level variable to perform minute dimming control, selecting an upper dimming symbol and a lower dimming symbol, which belong to Variable Pulse Position Modulation (VPPM) symbols, based on the dimming level variable, determining at least one of the number of upper dimming symbols to be sent and the number of lower dimming symbols to be sent based on the dimming level variable, and generating a transmission sequence corresponding to the dimming level variable by combining the upper dimming symbols and the lower dimming symbols based on the number of symbols to be sent.

16 Claims, 6 Drawing Sheets

VISIBLE LIGHT COMMUNICATION APPARATUS CAPABLE OF MINUTE DIMMING CONTROL AND METHOD USING THE SAME

CROSS-REFERENCE TO RELATED APPLICATIONS

This application claims the benefits of Korean Patent Application No. 10-2011-0065559, filed on Jul. 1, 2011, and Korean Patent Application No. 10-2011-0093038, filed on Sep. 15, 2011, which are hereby incorporated by reference in their entirety into this application.

BACKGROUND OF THE INVENTION

1. Technical Field

The present invention relates generally to a visible light communication apparatus and dimming control technology and, more particularly, to a visible light communication apparatus and a visible light communication method using the same, which are applied to dimming control in Variable Pulse Position Modulation (VPPM) mode and can perform minute dimming control.

2. Description of the Related Art

Visible light is light having a wavelength in the range visible to the human eye among electromagnetic waves, and the wavelength ranges from 380 nm to 780 nm.

In visible light, variations in characteristics resulting from differences in wavelength are exhibited in the form of colors, and the wavelength decreases across the spectrum from red to violet. Light having a wavelength longer than that of red color is referred to as infrared light, and light having a wavelength shorter than that of violet is referred to as ultraviolet light. In the case of monochromatic light, 700~610 nm corresponds to red, 610~590 nm corresponds to orange, 590~570 nm corresponds to yellow, 570~500 nm corresponds to green, 500~450 nm corresponds to blue, and 450~400 nm corresponds to violet. A variety of colors can be represented by mixing colors having the wavelengths.

Visible light is visible to humans, unlike infrared light or ultraviolet light. Illumination which emits visible light should satisfy a variety of requirements such as accurate color representation. One of these requirements is little flickering.

Since humans cannot perceive 200 or more flickers per second, illumination apparatuses using Light Emitting Diodes (LEDs) having fast flicker performance control flickering using Pulse Width Modulation (PWM) in order to increase the lifespan thereof and save energy.

Visible Light Communication (VLC) is a wireless communication technology using a wavelength in the range of 380 nm to 780 nm. The visible light communication standardization process is being conducted within the IEEE 802.15 Wireless Personal Area Network (WPAN) Working Group. In Korea, the Telecommunications Technology Association (TTA) is operating a visible light communication working group.

For visible light communication, several modulation methods are being discussed. One of these methods is On-Off Keying (OOK). On-off keying is a modulation method in which the case where a signal level is high represents '1' and the case where a signal level is low represents '0', or the case where a signal level is high represents '0' and the case where a signal level is low represents '1.' This on-off keying is chiefly used in optical communication because modulation signals can be directly converted into the flickers of light.

In addition to on-off keying, Pulse Position Modulation (PPM), Pulse Amplitude Modulation (PAM), and sub-carrier 4PPM (SC-4PPM) in which a carrier is combined with a PPM signal are being considered as modulation methods for visible light communication.

Methods of controlling the dimming of LED illumination apparatuses include a variety of methods, such as a method of varying the amount of current flowing through LEDs by varying a voltage applied to a simple variable resistor, and a method of controlling periods in which LEDs remain turned on by varying the pulse width of a voltage applied to the LEDs.

In illumination apparatuses using LEDs, the dimming of illumination is controlled using Pulse Width Modulation (PWM) which achieves the highest efficiency and minute current control. PWM controls the luminance of light by controlling periods in which LEDs remain turned on using a method of controlling the ratio of signal-on to signal-off. That is, when the period in which LEDs remain turned on is long within a unit time, LEDs emit bright light. In contrast, when the period in which LEDs remain turned on is short within a unit time, the illumination of the LEDs becomes dark.

The visible light communication technology includes a Variable PPM (VPPM) technology that enables both communication and dimming at the same time. This technology enables both communication and dimming at the same time by varying the length of an interval in which a light source remains turned on within a single symbol of PPM.

However, minute dimming using only a pulse width is problematic in that it is difficult to implement it and in that a lot of cost and time are required even though it can be implemented. Furthermore, when a signal is transmitted with its pulse width adjusted minutely, it is difficult to decode the signal at a receiver.

Accordingly, there is an urgent need for a new dimming control technology which is capable of more simply and effectively controlling brightness in visible light communication.

SUMMARY OF THE INVENTION

Accordingly, the present invention has been made keeping in mind the above problems occurring in the prior art, and an object of the present invention is to provide a visible light communication apparatus capable of supporting minute dimming control and a visible light communication method using the same, which enable both data communication and more minute dimming control by combining VPPM dimming signals whose brightness is roughly controlled.

Another object of the present invention is to provide a visible light communication apparatus capable of supporting minute dimming control and a visible light communication method using the same, which are capable of generating a transmission sequence corresponding to desired brightness by appropriately combining VPPM dimming signals.

In order to accomplish the above objects, the present invention provides a visible light communication method, including determining a dimming level variable to perform minute dimming control; selecting an upper dimming symbol and a lower dimming symbol, which belong to Variable Pulse Position Modulation (VPPM) symbols, based on the dimming level variable; determining at least one of the number of upper dimming symbols to be sent and the number of lower dimming symbols to be sent based on the dimming level variable; and generating a transmission sequence corresponding to the dimming level variable by combining the upper dimming symbols and the lower dimming symbols based on the number of symbols to be sent.

The VPPM symbols may include a VPPM symbol corresponding to a state in which a light source is completely turned off; a VPPM symbol corresponding to a state in which a light source is completely turned on; and nine VPPM symbols corresponding to nine VPPM duty cycles which vary from 0.1 to 0.9 in increments of 0.1, and having VPPM symbol indices which are natural numbers ranging from 1 to 9.

The upper dimming symbol may be the darkest of VPPM symbols that correspond to brightness that is brighter than a dimming level corresponding to the dimming level variable. The upper dimming symbol may correspond to a symbol index that is calculated by rounding, to a next higher integer, a value obtained by dividing the dimming level variable by 1000.

The lower dimming symbol may be the brightest of VPPM symbols that correspond to brightness that is darker than the dimming level corresponding to the dimming level variable. The lower dimming symbol may correspond to a symbol index that is calculated by rounding, to a next lower integer, a value obtained by dividing the dimming level variable by 1000.

The determining the number of symbols to be sent include calculating the number of upper dimming symbols to be sent using the dimming level variable; and calculating the number of lower dimming symbols to be sent using the number of upper dimming symbols to be sent. The number of upper dimming symbols to be sent may be calculated by subtracting (a symbol index of the lower dimming symbol×100) from the dimming level variable. The number of lower dimming symbols to be sent may be calculated by subtracting the number of upper dimming symbols from 100.

The generating a transmission sequence may include allocating data symbols to a number of lower dimming symbols equal to the number of lower dimming symbols to be sent; allocating data symbols to a number of upper dimming symbols equal to the number of upper dimming symbols to be sent; and, if data symbols which should be transmitted are not divided by 100, allocating VPPM idle pattern symbols to the lower dimming symbols or upper dimming symbols so that the transmission sequence can be divided by 100.

In order to accomplish the above objects, the present invention provides a visible light communication apparatus, including a dimming level determination unit for determining a dimming level variable to perform minute dimming control; a dimming symbol selection unit for selecting an upper dimming symbol and a lower dimming symbol, which belong to VPPM symbols, based on the dimming level variable; a unit for calculating the number of symbols to be sent, the unit for calculating the number of symbols to be sent being configured to determine at least one of the number of upper dimming symbols to be sent and the number of lower dimming symbols to be sent based on the dimming level variable; and a signal generator for generating a transmission sequence corresponding to the dimming level variable by combining the upper dimming symbols and the lower dimming symbols based on the number of symbols to be sent.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
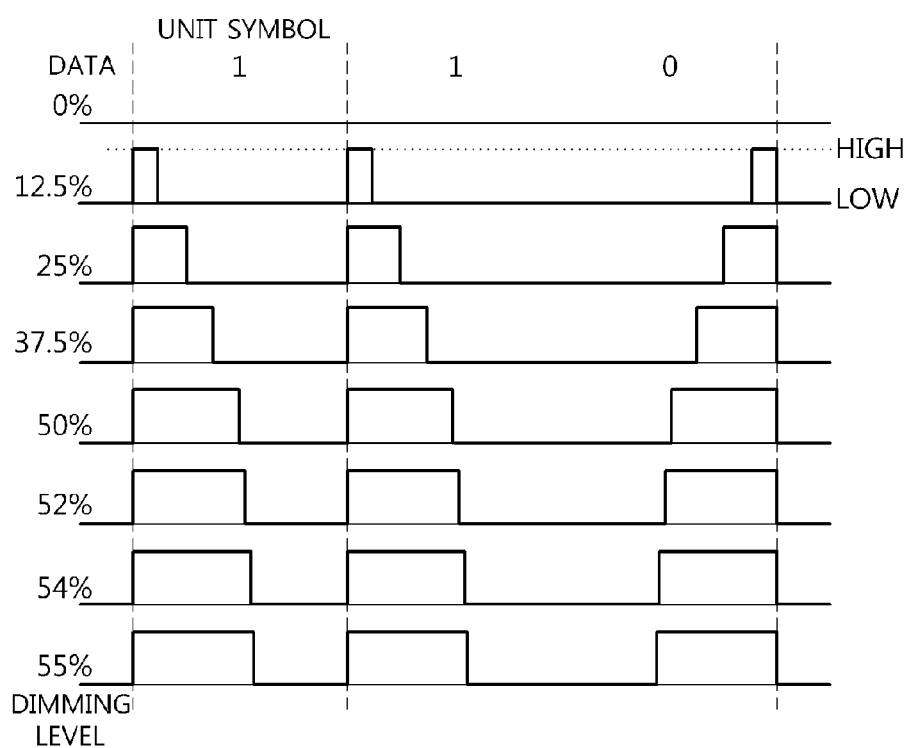
FIG. 1 is a diagram illustrating examples of VPPM signals.

Reference should now be made to the drawings, throughout which the same reference numerals are used to designate the same or similar components.

The present invention will be described in detail below with reference to the accompanying drawings. Repeated descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

Preferred embodiments according to the present invention will be described in detail below with reference to the accompanying drawings.

FIG. 1 is a diagram illustrating examples of VPPM signals.

From FIG. 1, it can be seen that both dimming and communication can be performed at the same time using VPPM signals.

The longer the interval in which a light source, such as a Light Emitting Diode (LED), remains turned on, that is, the period in which a signal level is high within a unit symbol, is, the brighter the light emitted by the light source is. Furthermore, the case where a signal level is located on the front side of a unit symbol may represent the data '0', while the case where a signal level is located in the rear side of a unit symbol may represent the data '1.' It will be apparent that in some embodiments, the case where the interval in which a signal level is high is located on the front side of a unit symbol may represent the data '1', while the case where the interval in which a signal level is high is located on the rear side of a unit symbol may represent the data '0.'

The examples shown in FIG. 1 show the case where brightness is 0%, the case when brightness is 12.5%, the case where brightness is 25%, the case where brightness is 37.5%, the case when brightness is 50%, the case when brightness is 52%, the case where brightness is 54%, and the case where brightness is 55%, respectively.

Figure 2:
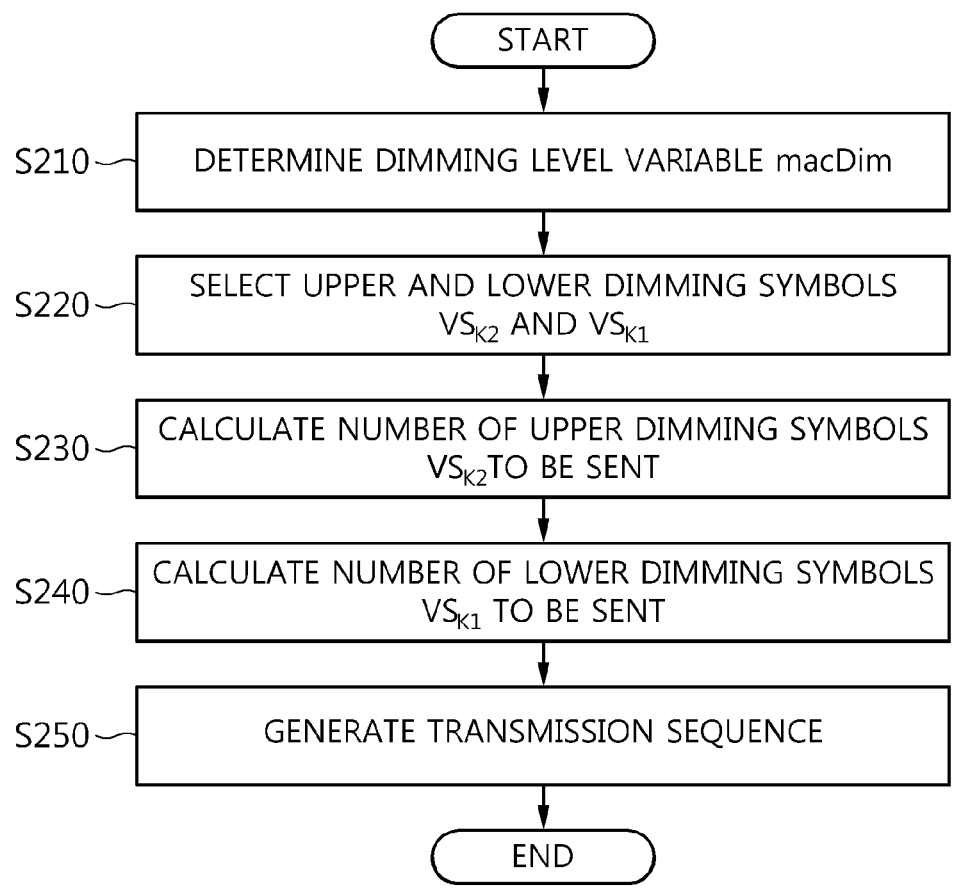
FIG. 2 is a flowchart illustrating a visible light communication method according to an embodiment of the present invention.

FIG. 2 is a flowchart illustrating a visible light communication method according to an embodiment of the present invention.

Referring to FIG. 2, in the visible light communication method according to the embodiment of the present invention, a dimming level variable macDim is determined at step S210.

Here, the dimming level variable macDim may be determined based on a user's selection, or may be determined by an automatic control algorithm.

Thereafter, an upper dimming symbol $VS_{k2}$ and a lower dimming symbol $VS_{k1}$, which belong to VPPM symbols, are selected based on the dimming level variable macDim at step S220. That is, once the dimming level variable has been determined, two types of VPPM dimming symbols that are combined together to achieve a desired dimming level are determined.

Here, the VPPM symbols may be VPPM dimming symbols which vary in increments of 10%. That is, the VPPM dimming symbols are defined as 11 symbols, including $VS_0$, $VS_1$, $VS_2$, $VS_3$, $VS_4$, $VS_5$, $VS_6$, $VS_7$, $VS_8$, $VS_9$, and $VS_{10}$. $VS_0$ corresponds to the state in which illumination is completely turned off, while $VS_{10}$ corresponds to the state in which illumination is completely turned on. Furthermore, $VS_1$ may correspond to a state of 10% dimming, while $VS_2$ may correspond to a state of 90% dimming.

In other words, the VPPM symbols may include the VPPM symbol $VS_0$ corresponding to the state in which the light source is completely turned off, the VPPM symbol $VS_{10}$ corresponding to the state in which the light source is completely turned on, and the nine VPPM symbols $VS_1$, $VS_2$, $VS_3$, $VS_4$, $VS_5$, $VS_6$, $VS_7$, $VS_8$, and $VS_9$ corresponding to nine VPPM duty cycles which vary from 0.1 to 0.9 in increments of 0.1, and having VPPM symbol indices which are natural numbers ranging from 1 to 9.

As a result, the present invention can accomplish minute dimming by combining the dimming symbols that vary in increments of 10%.

When VPPM that enables both communication and dimming at the same time is employed, performing dimming in increments of 10% may be advantageous in terms of reception.

Here, the upper dimming symbol may be the darkest of the VPPM symbols that correspond to brightness that is brighter than a dimming level corresponding to the dimming level variable.

Furthermore, the lower dimming symbol may be the brightest of the VPPM symbols that correspond to brightness that is darker than the dimming level corresponding to the dimming level variable.

For example, when a 33% dimming level is selected, $VS_4$ of 40% brightness, that is, the darkest of the dimming symbols corresponding to brightness brighter than 33%, and $VS_3$ of 30% brightness, that is, the brightest of the dimming symbols corresponding to brightness darker than 33%, are selected.

In this case, the upper dimming symbol may correspond to a symbol index $k_2$ that is calculated by rounding, to the next higher integer, a value obtained by dividing the dimming level variable macDim by 1000. Furthermore, the lower dimming symbol may correspond to a symbol index $k_1$ that is calculated by rounding, to the next lower integer, a value obtained by dividing the dimming level variable macDim by 1000.

The above-described determination of the upper dimming symbol and the lower dimming symbol may be represented using the following Equations 1 and 2.

$$k_2 = \lceil macDim/100 \rceil \quad (1)$$

when $\lceil \; \rceil$ signifies rounding to the next higher integer, $k_2$ is the symbol index of the upper dimming symbol, and macDim is the dimming level variable.

$$k_1 = \lfloor macDim/100 \rfloor \quad (2)$$

when $\lfloor \; \rfloor$ signifies rounding to the next lower integer, $k_1$ is the symbol index of the lower dimming symbol, and macDim is the dimming level variable.

For example, when the dimming level variable macDim is set to 330 (0≤macDim≤1000) in order to achieve a 33% dimming level, the symbol index $k_2$ of the upper dimming symbol becomes 4 which is obtained by rounding 3.3 to the next higher integer, and the symbol index $k_1$ of the lower dimming symbol becomes 3 which is obtained by rounding 3.3 to the next lower integer.

Thereafter, the number of upper dimming symbols VS to be sent is determined based on the dimming level variable macDim at step S230.

Here, the number of upper dimming symbols VS to be sent may be calculated by subtracting (the symbol index $k_1$ of the lower dimming symbol×100) from the dimming level variable macDim.

That is, the number of upper dimming symbols VS to be sent may be calculated by the following Equation 3:

$$rep\_2 = macDim - 100 * k_1 \quad (3)$$

when rep__2 is the number of upper dimming symbols to be sent, macDim is the dimming level variable, and $k_1$ is the symbol index of the lower dimming symbol.

For example, when the dimming level variable macDim is set to 330 so as to achieve a 33% dimming level, the symbol index $k_2$ of the upper dimming symbol is 4 and the symbol index $k_1$ of the lower dimming symbol is 3, the number of upper dimming symbols to be sent becomes 30 which is obtained by subtracting 300 from 330.

Thereafter, the number of lower dimming symbols $VS_{k1}$ to be sent is determined based on the number of upper dimming symbols $VS_1$ to be sent rep__2 at step S240.

Here, the number of lower dimming symbols $VS_{k1}$ to be sent may be calculated by subtracting the number of upper dimming symbols $VS_1$ to be sent rep__2 from 100.

That is, the number of lower dimming symbols $VS_{k1}$ to be sent may be calculated by the following Equation 4:

$$rep\_1 = 100 - rep\_2 \quad (4)$$

when rep__1 is the number of lower dimming symbols to be sent, and rep__2 is the number of upper dimming symbols to be sent.

For example, when the dimming level variable macDim is set to 330 so as to achieve a 33% dimming level, the symbol index $k_2$ of the upper dimming symbol is 4, the symbol index $k_1$ of the lower dimming symbol is 3 and the number of upper dimming symbols to be sent is 30, the number of lower dimming symbols to be sent becomes 70 which is obtained by subtracting 30 from 100.

That is, while 100 data symbols are being transmitted, 70 data symbols are transmitted using lower dimming symbols, and 30 data symbols are transmitted using upper dimming symbols, thereby achieving the desired 33% dimming level dimming level.

Thereafter, a transmission sequence corresponding to the dimming level variable macDim is generated by combining upper dimming symbols $VS_1$ and lower dimming symbols $VS_{k1}$ based on the determined numbers of symbols to be sent at step S250.

Here, step S250 may include the step of allocating data symbols to a number of lower dimming symbols equal to the number of lower dimming symbols to be sent, the step of allocating data symbols to a number of upper dimming symbols equal to the number of upper dimming symbols to be sent, and the step of, if data symbols which should be transmitted are not divided by 100, allocating VPPM idle pattern symbols to the lower dimming symbols or upper dimming symbols so that the transmission sequence can be divided by 100.

That is, the ultimately desired dimming level can be achieved by repeating the upper dimming symbol $VS_{k2}$ rep__2 times and repeating the lower dimming symbol $VS_{k1}$ rep__1 times. Since there are generally many cases when the number of VPPM data symbols is not an integer multiple of 100, idle pattern symbols may be utilized to implement a desired dimming level.

For example, when the number of VPPM data symbols which should be transmitted is 80, data is allocated to 70 lower dimming symbols and then transmitted first, data is allocated to 10 upper dimming symbols and then transmitted, and idle pattern symbols are allocated to 20 upper dimming symbols and then transmitted, so as to achieve a 33% dimming level.

For example, when the number of VPPM data symbols which should be transmitted is 50, data is allocated to 50 lower dimming symbols and then transmitted first, idle pattern symbols are allocated to 20 lower dimming symbols and then transmitted, and idle pattern symbols are allocated to 30 upper dimming symbols and then transmitted, so as to achieve a 33% dimming level.

Figure 3:
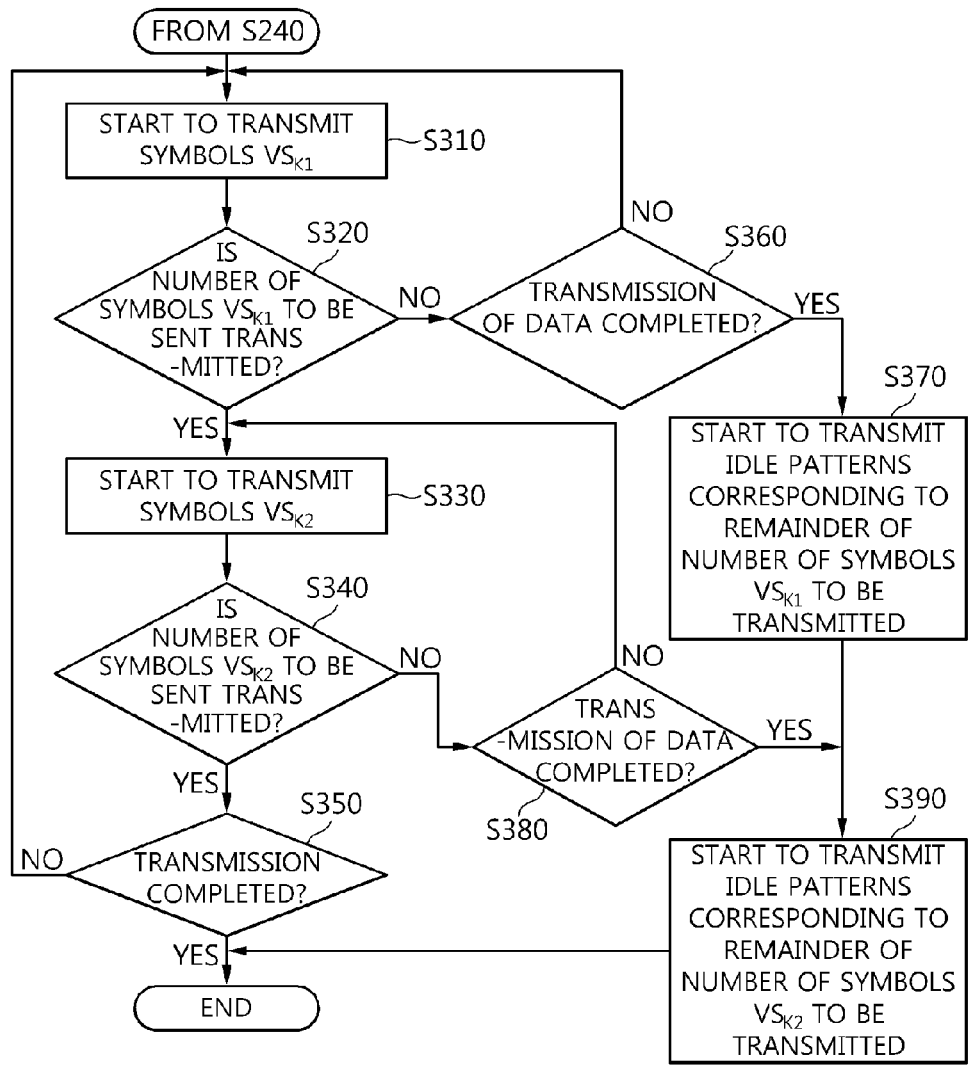
FIG. 3 is a flowchart illustrating an example of the step of generating a transmission sequence shown in FIG. 2.

FIG. 3 is a flowchart illustrating an example of the step of generating a transmission sequence shown in FIG. 2.

Referring to FIG. 3, at the step of generating a transmission sequence shown in FIG. 2, lower dimming symbols $VS_{k1}$ start to be sent first at step S310.

Thereafter, it is determined whether the number of transmitted lower dimming symbols $VS_{k1}$ is equal to the number of lower dimming symbols to be sent rep__1 at step S320.

If, as a result of the determination at step S320, the number of transmitted lower dimming symbols VSk1 is not equal to the number of lower dimming symbols to be sent rep__1, it is determined that the transmission of data has been completed at step S360.

If, as a result of the determination at step S360, it is determined that the transmission of data has not been completed, the process returns to step S310, at which data is allocated to lower dimming symbols and then transmitted.

If, as a result of the determination at step S360, it is determined that the transmission of data has been completed, a number of idle patterns equal to the remainder of the number of lower dimming symbols to be sent rep__1 are allocated to lower dimming symbols and then transmitted at step S370, and a number of idle patterns equal to the number of upper dimming symbols to be sent rep__2 are allocated to upper dimming symbols and then transmitted at step S390.

If, as a result of the determination at step S320, it is determined that a number of lower dimming symbols $VS_{k1}$ equal to the number of lower dimming symbols to be sent rep__1 have been transmitted, upper dimming symbols $VS_1$ start to be sent at step S330.

Thereafter, it is determined whether a number of upper dimming symbols $VS_{k2}$ equal to the number of upper dimming symbols to be sent rep__2 have been transmitted at step S340.

If, as a result of the determination at step S340, it is determined that a number of upper dimming symbols $VS_{k2}$ equal to the number of upper dimming symbols to be sent rep__2 have not been transmitted, it is determined whether the transmission of data has been completed at step S380.

If, as a result of the determination at step S380, it is determined that the transmission of data has not been completed, the process returns to step S330, at which data is allocated to upper dimming symbols and then transmitted.

If, as a result of the determination at step S380, it is determined that the transmission of data has been completed, a number of idle patterns equal to the remainder of the number of upper dimming symbols to be sent rep__2 are allocated to upper dimming symbols and then transmitted at step S390.

If, as a result of the determination at step S340, it is determined that a number of upper dimming symbols VSk2 equal to the number of upper dimming symbols to be sent rep__2 have not been transmitted, it is determined that the transmission of all data has been completed at step S350.

If, as a result of the determination at step S350, it is determined that the transmission of all data has not been completed, the process returns to step S310, at which data is allocated to lower dimming symbols and then transmitted.

If, as a result of the determination at step S350, it is determined that the transmission of all data has been completed, the step of generating a transmission sequence is terminated.

Figure 4:
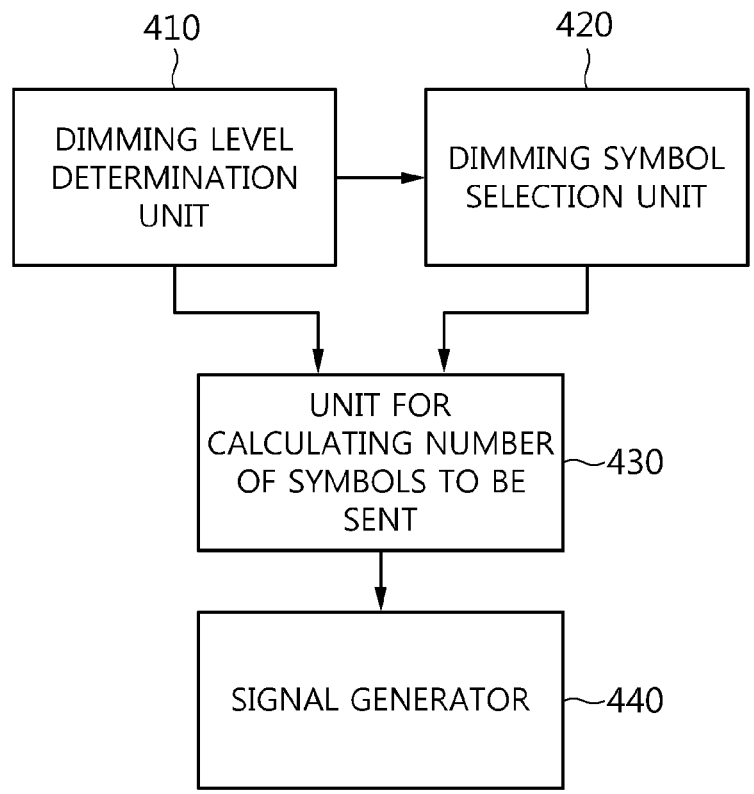
FIG. 4 is a block diagram illustrating a visible light communication apparatus according to an embodiment of the present invention.

FIG. 4 is a block diagram illustrating a visible light communication apparatus according to an embodiment of the present invention.

Referring to FIG. 4, the visible light communication apparatus according to the embodiment of the present invention includes a dimming level determination unit 410, a dimming symbol selection unit 420, a unit 430 for calculating the number of symbols to be sent, and a signal generator 440.

The dimming level determination unit 410 determines a dimming level variable to perform minute dimming control.

The dimming symbol selection unit 420 selects upper and lower dimming symbols, which belong to VPPM symbols, based on the dimming level variable.

Here, the VPPM symbols may include a VPPM symbol corresponding to the state in which the light source is completely turned off, a VPPM symbol corresponding to the state in which the light source is completely turned on, and nine VPPM symbols corresponding to nine VPPM duty cycles which vary from 0.1 to 0.9 in increments of 0.1, and having VPPM symbol indices which are natural numbers ranging from 1 to 9.

Here, the upper dimming symbol may be the darkest of the VPPM symbols that correspond to brightness that is brighter than a dimming level corresponding to the dimming level variable. Furthermore, the upper dimming symbol may correspond to a symbol index that is calculated by rounding, to the next higher integer, a value obtained by dividing the dimming level variable by 1000.

Here, the lower dimming symbol may be the brightest of the VPPM symbols that correspond to brightness that is darker than the dimming level corresponding to the dimming level variable. Furthermore, the lower dimming symbol may correspond to a symbol index that is calculated by rounding, to the next lower integer, a value obtained by dividing the dimming level variable by 1000.

The unit 430 for calculating the number of symbols to be sent determines the number of upper dimming symbols and/or lower dimming symbols to be sent based on the dimming level variable.

The signal generator 440 generates a transmission sequence corresponding to the dimming level variable by combining upper dimming symbols and lower dimming symbols based on the determined numbers of symbols to be sent.

Here, the signal generator 440 may allocate data symbols to a number of lower dimming symbols equal to the number of lower dimming symbols to be sent, allocate data symbols to a number of upper dimming symbols equal to the number of upper dimming symbols to be sent, and, if data symbols which should be transmitted are not divided by 100, allocate VPPM idle pattern symbols to the lower dimming symbols or upper dimming symbols so that the transmission sequence can be divided by 100.

Figure 5:
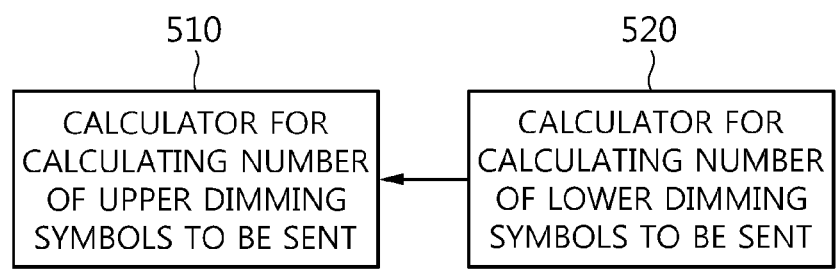
FIG. 5 is a block diagram illustrating an example of the unit for calculating the number of symbols to be sent shown in FIG. 4.

FIG. 5 is a block diagram illustrating an example of the unit 430 calculating the number of symbols to be sent shown in FIG. 4.

Referring to FIG. 5, the unit for calculating the number of symbols to be sent includes a calculator 510 for calculating the number of upper dimming symbols to be sent and a calculator 520 for calculating the number of lower dimming symbols to be sent.

The calculator 510 for calculating the number of upper dimming symbols to be sent calculates the dimming level variable. Here, the calculator 510 for calculating the number of upper dimming symbols to be sent may calculate the number of upper dimming symbols to be sent using Equation 3.

The calculator 520 for calculating the number of lower dimming symbols to be sent calculates the number of lower dimming symbols to be sent using the number of upper dimming symbols to be sent. Here, the calculator 520 for calculating the number of lower dimming symbols to be sent may calculate the number of lower dimming symbols to be sent using Equation 4.

Figure 6:
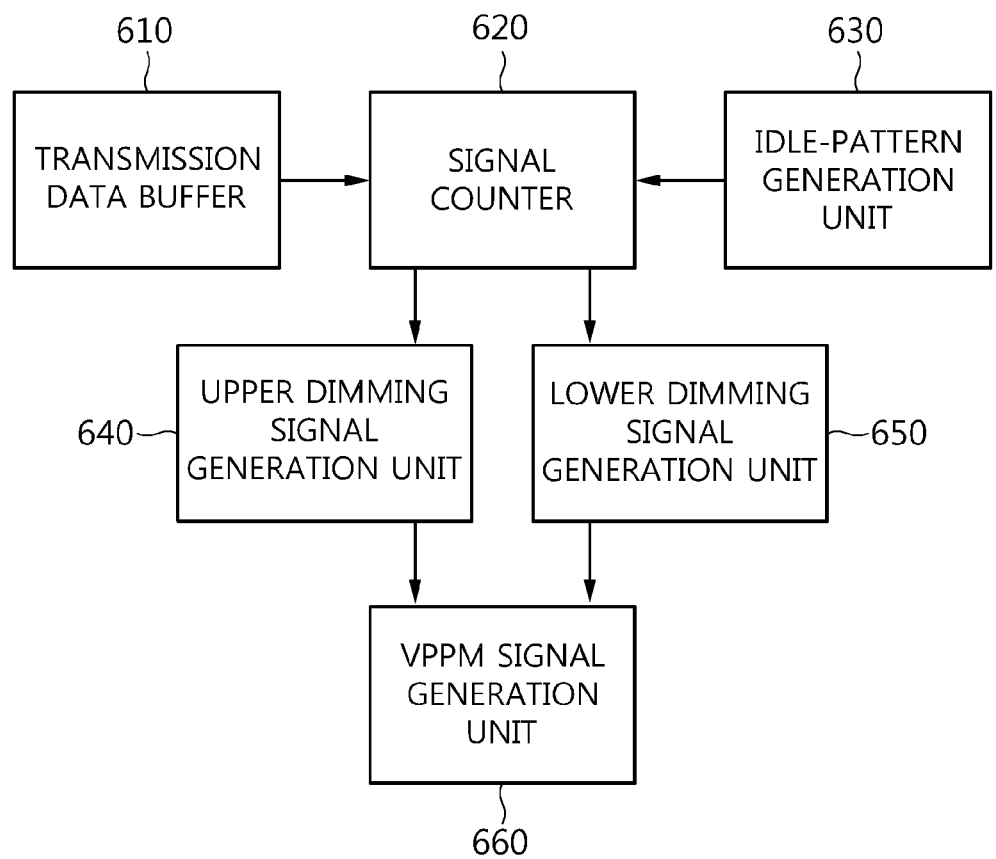
FIG. 6 is a block diagram illustrating an example of the signal generator shown in FIG. 4.

FIG. 6 is a block diagram illustrating an example of the signal generator shown in FIG. 4.

Referring to FIG. 6, the signal generator includes a transmission data buffer 610, a signal counter 620, an idle-pattern generation unit 630, an upper brightness signal creation unit 640, a lower brightness signal creation unit 650, and a VPPM signal creation unit 660.

The transmission data buffer 610 stores data that is transferred from an upper layer and is to be sent.

The signal counter 620 is supplied with information about the number of upper dimming symbols to be sent and the number of lower dimming symbols to be sent. The signal counter 620 reads data to be sent from the transmission data buffer 610, and transfers the data to be sent to the upper brightness signal creation unit 640 and the lower brightness signal creation unit 650 while counting the number of upper dimming symbols transmitted and the number of lower dimming symbols transmitted.

Furthermore, the signal counter 620, if there is a remainder of the number of upper dimming symbols to be sent or the number of lower dimming symbols to be sent but there is no data to be sent, receives an idle pattern from the idle-pattern generation unit 630 and transfers it to the upper brightness signal creation unit 640 or lower brightness signal creation unit 650.

The VPPM signal creation unit 660 finally generates a VPPM signal providing a desired brightness by combining signals generated by the upper brightness signal creation unit 640 and the lower brightness signal creation unit 650.

Figure 7:
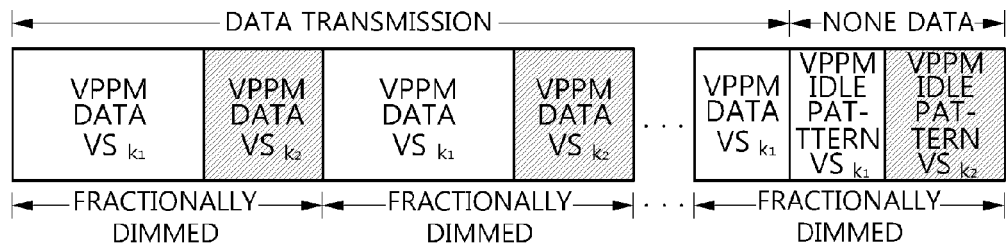
FIGS. 7 and 8 are diagrams illustrating examples in which idle patterns are inserted into a transmission sequence.
Figure 8:
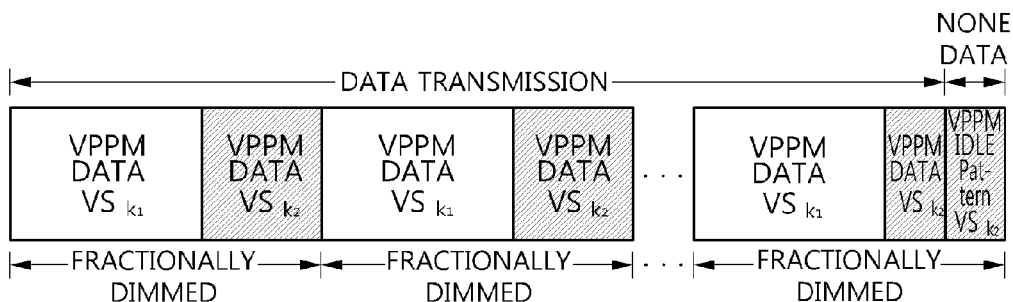

FIGS. 7 and 8 are diagrams illustrating examples in which idle patterns are inserted into a transmission sequence.

From FIG. 7, it can be seen that idle patterns are allocated to a lower dimming symbol $VS_{K1}$ and an upper dimming symbol $VS_{KZ}$ and then a transmission sequence is generated.

That is, the lower dimming symbol $VS_{K1}$ is repeated rep_1 times and the upper dimming symbol $VS_{K2}$ is repeated rep_2 times so as to finally achieve a desired dimming level, and idle patterns are allocated to lower and upper dimming symbols if the transmission of data is completed during the transmission of a lower dimming symbol.

From FIG. 8, it can be seen that an idle pattern is allocated only to an upper dimming symbol $VS_{K2}$ and then a transmission sequence is generated.

That is, the lower dimming symbol $VS_{K1}$ is repeated rep_1 times and the upper dimming symbol $VS_{K2}$ is repeated rep_2 times so as to finally achieve a desired dimming level, and an idle pattern is allocated to an upper dimming symbol if the transmission of data is completed during the transmission of an upper dimming symbol.

In this way, it is possible to perform dimming control at an accuracy of 0.1% using VPPM symbols having a resolution of 10%.

Figure 9:
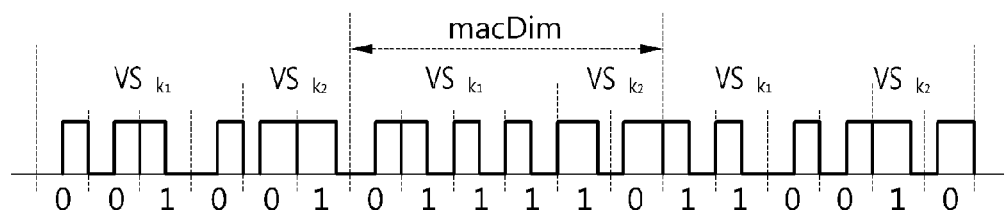
FIG. 9 is a waveform diagram illustrating an example in which brightness corresponding to a dimming level variable is implemented using a combination of VPPM symbols.

FIG. 9 is a waveform diagram illustrating an example in which brightness corresponding to a dimming level variable is implemented using a combination of VPPM symbols.

From FIG. 9, it can be seen that while the 18 bit data "001001011110110010" is being transmitted, lower dimming symbols $VS_{K1}$ and upper dimming symbols $VS_{K2}$ are combined in a ratio of 2:1, and therefore brightness corresponding to the dimming level variable macDim is implemented.

The present invention has the advantage of enabling both data communication and more minute dimming control by combining VPPM dimming signals whose brightness is roughly controlled.

Furthermore, the present invention has the advantage of generating a transmission sequence corresponding to desired brightness by appropriately combining VPPM dimming signals.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A visible light communication method, comprising:
  determining a dimming level variable to perform minute dimming control;
  selecting an upper dimming symbol and a lower dimming symbol, which belong to Variable Pulse Position Modulation (VPPM) symbols, based on the dimming level variable;
  determining at least one of a number of upper dimming symbols to be sent and a number of lower dimming symbols to be sent based on the dimming level variable; and
  generating a transmission sequence corresponding to the dimming level variable by combining the upper dimming symbols and the lower dimming symbols based on the number of symbols to be sent,
  wherein the VPPM symbols comprise:
    a VPPM symbol corresponding to a state in which a light source is completely turned off;
    a VPPM symbol corresponding to a state in which a light source is completely turned on; and
    nine VPPM symbols corresponding to nine VPPM duty cycles which vary from 0.1 to 0.9 in increments of 0.1, and having VPPM symbol indices which are natural numbers ranging from 1 to 9,
  wherein the generating a transmission sequence comprises:

allocating data symbols to a number of lower dimming symbols equal to the number of lower dimming symbols to be sent;

allocating data symbols to a number of upper dimming symbols equal to the number of upper dimming symbols to be sent; and if data symbols to be transmitted are not divided by 100, allocating VPPM idle pattern symbols to the lower dimming symbols or upper dimming symbols so that the transmission sequence is to be divided by 100.

2. The visible light communication method of claim 1, wherein the upper dimming symbol is a darkest one of VPPM symbols that correspond to brightness that is brighter than a dimming level corresponding to the dimming level variable.

3. The visible light communication method of claim 2, wherein the upper dimming symbol corresponds to a symbol index that is calculated by rounding, to a next higher integer, a value obtained by dividing the dimming level variable by 1000.

4. The visible light communication method of claim 3, wherein the lower dimming symbol is a brightest one of VPPM symbols that correspond to brightness that is darker than the dimming level corresponding to the dimming level variable.

5. The visible light communication method of claim 4, wherein the lower dimming symbol corresponds to a symbol index that is calculated by rounding, to a next lower integer, a value obtained by dividing the dimming level variable by 1000.

6. The visible light communication method of claim 1, wherein the determining a number of symbols to be sent comprises:

calculating the number of upper dimming symbols to be sent using the dimming level variable; and calculating the number of lower dimming symbols to be sent using the number of upper dimming symbols to be sent.

7. The visible light communication method of claim 6, wherein the number of upper dimming symbols to be sent is calculated by subtracting a value, obtained by multiplying the symbol index of the lower dimming symbol by 100, from the dimming level variable.

8. The visible light communication method of claim 7, wherein the number of lower dimming symbols to be sent is calculated by subtracting the number of upper dimming symbols from 100.

9. A visible light communication apparatus, comprising:

a dimming level determination unit for determining a dimming level variable to perform minute dimming control;

a dimming symbol selection unit for selecting an upper dimming symbol and a lower dimming symbol, which belong to VPPM symbols, based on the dimming level variable;

a unit for calculating the number of symbols to be sent, the unit for calculating the number of symbols to be sent being configured to determine at least one of a number of upper dimming symbols to be sent and a number of lower dimming symbols to be sent based on the dimming level variable; and a signal generator for generating a transmission sequence corresponding to the dimming level variable by combining the upper dimming symbols and the lower dimming symbols based on the number of symbols to be sent, wherein the VPPM symbols comprise:

a VPPM symbol corresponding to a state in which a light source is completely turned off;

a VPPM symbol corresponding to a state in which a light source is completely turned on; and nine VPPM symbols corresponding to nine VPPM duty cycles which vary from 0.1 to 0.9 in increments of 0.1, and having VPPM symbol indices which are natural numbers ranging from 1 to 9 wherein the signal generator is configured to:

allocate data symbols to a number of lower dimming symbols equal to the number of lower dimming symbols to be sent;

allocate data symbols to a number of upper dimming symbols equal to the number of upper dimming symbols to be sent; and if data symbols to be transmitted are not divided by 100, allocate VPPM idle pattern symbols to the lower dimming symbols or upper dimming symbols so that the transmission sequence is to be divided by 100.

10. The visible light communication apparatus of claim 9, wherein the upper dimming symbol is a darkest one of VPPM symbols that correspond to brightness that is brighter than a dimming level corresponding to the dimming level variable.

11. The visible light communication apparatus of claim 10, wherein the upper dimming symbol corresponds to a symbol index that is calculated by rounding, to a next higher integer, a value obtained by dividing the dimming level variable by 1000.

12. The visible light communication apparatus of claim 11, wherein the lower dimming symbol is a brightest one of VPPM symbols that correspond to brightness that is darker than the dimming level corresponding to the dimming level variable.

13. The visible light communication apparatus of claim 12, wherein the lower dimming symbol corresponds to a symbol index that is calculated by rounding, to a next lower integer, a value obtained by dividing the dimming level variable by 1000.

14. The visible light communication apparatus of claim 9, wherein the unit for calculating the number of symbols to be sent comprises:

a calculator for calculating a number of upper dimming symbols to be sent, the calculator for calculating a number of upper dimming symbols to be sent being configured to calculate the number of upper dimming symbols to be sent using the dimming level variable; and a calculator for calculating a number of lower dimming symbols to be sent, the calculator for calculating a number of lower dimming symbols to be sent being configured to calculate the number of lower dimming symbols to be sent using the number of upper dimming symbols to be sent.

15. The visible light communication apparatus of claim 14, wherein the number of upper dimming symbols to be sent is calculated by subtracting a value, obtained by multiplying the symbol index of the lower dimming symbol by 100, from the dimming level variable.

16. The visible light communication apparatus of claim 15, wherein the number of lower dimming symbols to be sent is calculated by subtracting the number of upper dimming symbols from 100.

* * * * *